United States Patent [19]
Pool

[11] 3,734,102
[45] May 22, 1973

[54] DRIVE FOR ORBITING SIEVE OF COMBINE

[75] Inventor: Stuart D. Pool, Crystal Lake, Ill.

[73] Assignee: Bernard Mathews, Crystal Lake, Ill.

[22] Filed: Nov. 1, 1971

[21] Appl. No.: 194,238

[52] U.S. Cl..................................................130/26
[51] Int. Cl................................................A01f 12/30
[58] Field of Search...................................130/24, 26

[56] References Cited

UNITED STATES PATENTS

| 857,147 | 6/1907 | Bakken | 130/26 |
| 3,495,597 | 2/1970 | Schlue | 130/26 |
| 817,289 | 4/1906 | Whitney | 130/26 |
| 3,412,859 | 11/1968 | Thornton | 130/26 |
| 3,478,749 | 11/1969 | Davidow et al. | 130/26 |

Primary Examiner—Antonio F. Goida
Attorney—Foster York

[57] ABSTRACT

A combine has an upper sieve and a lower sieve connected to each other at the front and rear ends by front and rear linkages. Each linkage has a rock lever, and two vertically extending links connected to the respective sieves. The rock lever is fulcrumed in walls of the combine casing. The rear end of the upper sieve is driven by a first crank and the front end of the lower sieve is driven by a second crank of less radius. The vertical crank motion of the rear end of the upper sieve is transmitted to the rear end of the lower sieve by the rear linkage, and the crank vertical motion of the front end of the lower sieve is transmitted to the front end of the upper sieve by the front linkage. The front end of the upper sieve has elliptical orbiting motion, and the whole of the lower sieve and a rear part of the upper sieve have circular orbiting motion.

3 Claims, 3 Drawing Figures

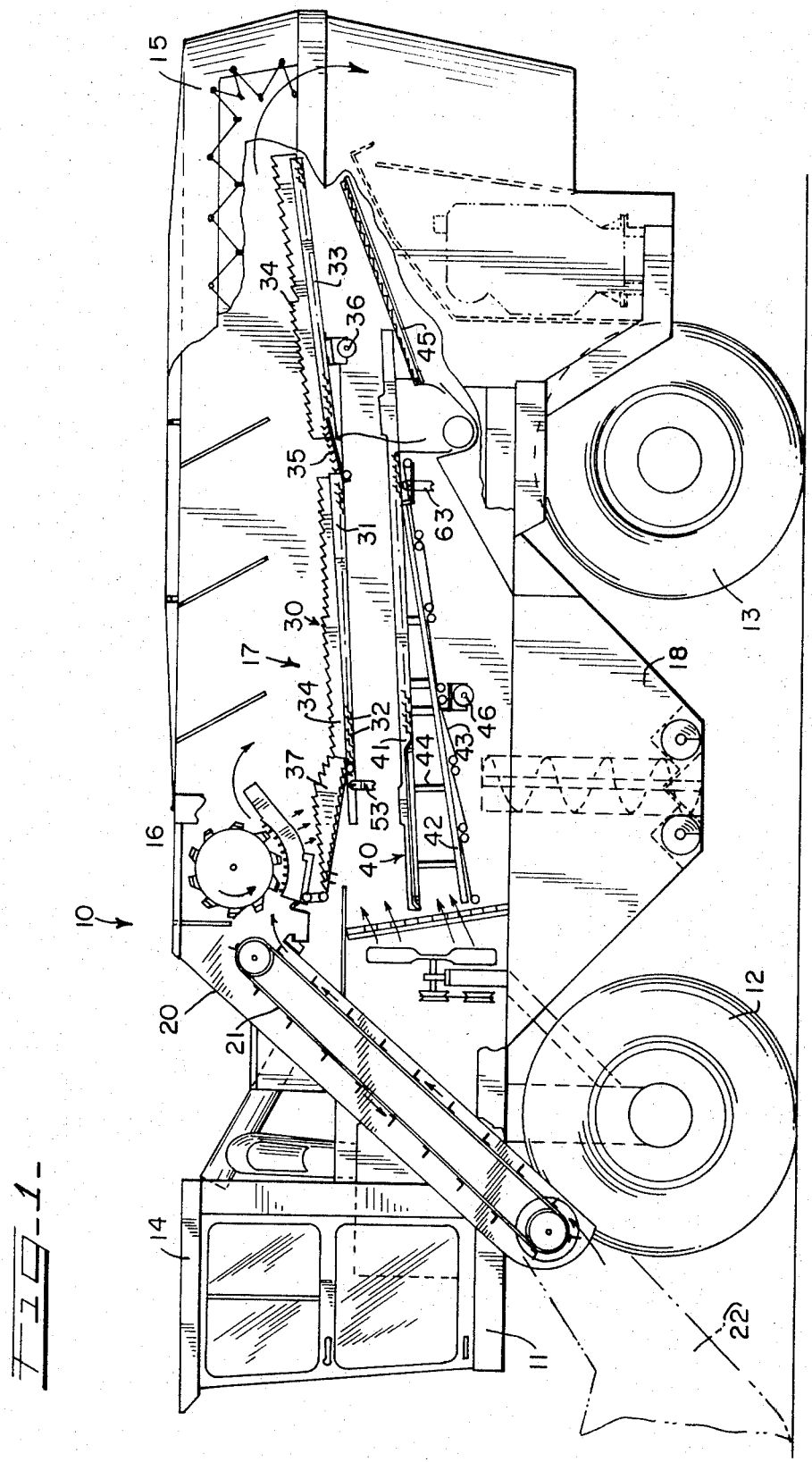

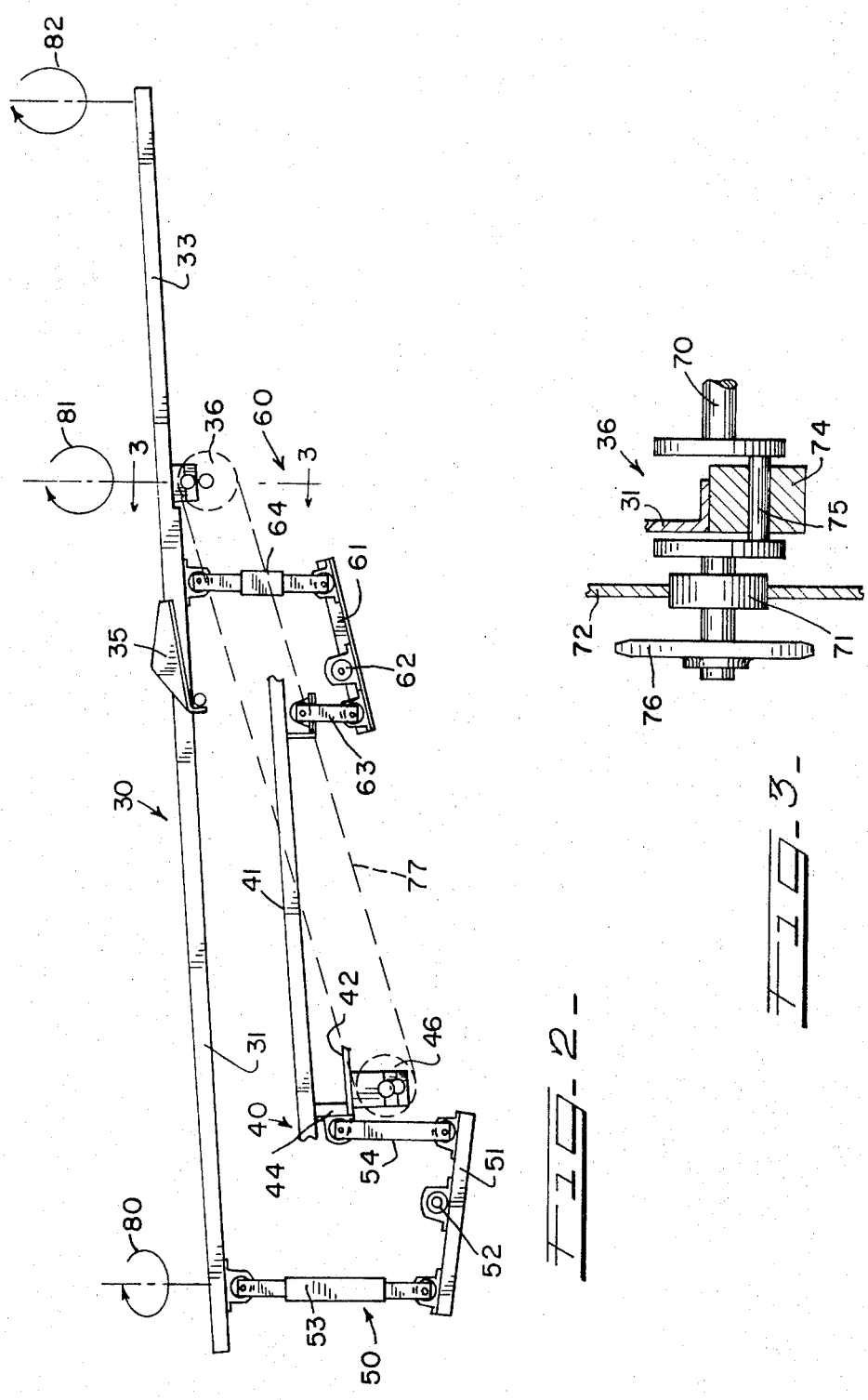

DRIVE FOR ORBITING SIEVE OF COMBINE

BACKGROUND OF INVENTION

The present invention relates to combines, and in particular to an improved drive for an orbiting sieve of the type shown in Mathews U.S. Pat. No. 3,606,026, granted Sept. 20, 1971.

In that patent, the sieve is supported by four cranks, two at each side, with one at the front of the sieve and the other at the back. The two cranks at each side are connected by a chain and sprockets. In that arrangement, the sieve structure which extends between the cranks acts as a connecting rod between the cranks.

It is very difficult to provide a smooth and uniform orbiting sieve motion with this driving arrangement due to the fact that as the chain wears and slack develops in the chain, one sprocket will tend to lag behind the other sprocket, the extent of the lag varying with chain length and sprocket diameter. Then the driving effect exerted by the chain on the lagging sprocket will be out of phase with the driving effect exerted by the connecting rod aspect of the sieve. As a result, the bearings for the crank pins are subjected to undue wear, and the sieve structure will be subjected to warping stresses resulting in early failure of both sieve drive and sieve parts.

SUMMARY OF INVENTION

I have found that a smoother and much more uniform sieve motion is provided if the horizontal motion component is imparted to the sieve only at one end, whereas the vertical motion component is imparted at both ends. Thus, there is no tendency for the connecting rod and the chain and sprocket mechanism to fight each other, particularly as they pass through the dead center position.

According to my invention, referring to only one side of the sieve, I provide the crank at only one end of the sieve, and at the other end I provide a vertically extending linkage which is designed to impart vertical motion to that end but which takes up the horizontal motion imparted to the sieve by the crank.

In the particular embodiment of my invention which is shown, there are two sieves, an upper sieve and a lower sieve, the upper sieve having a crank at its rear end and the lower sieve having a crank toward its front end. The upper and lower sieves are connected to each other both at the front end and at the rear end by separate linkages so that the vertical motion component of the upper sieve at a point near the crank is transmitted to the rear end of the lower sieve, whereas the vertical motion component of the lower sieve at a point near its crank is transmitted to the front end of the upper sieve. The phase relationship of the two cranks is maintained by a chain and sprocket mechanism connecting the two. Whereas exact phase relationship is desirable, nevertheless when slack in the chain tends to cause one crank to lag behind the other, this will not damage the crank pin bearings because the horizontal motion component is imparted to each sieve at only the one point, namely the crank pin bearing.

Also, in an arrangement such as this, the sieve, together with its grain load, is supported by the driving mechanism. According to my invention, a great deal of the supporting function is performed by the linkages, thus reducing the crank loads. Also, in a two-sieve arrangement, where one sieve acts as a counterbalance to the other, the linkage arrangement is much better adapted to transmission of vertical force from one sieve to another than are two sets of two cranks connected by a chain and sprockets.

BRIEF DESCRIPTION OF DRAWINGS

FIG. 1 is a side elevation of a combine embodying my invention, a portion of the side wall being removed and some of the elements being shown diagrammatically;

FIG. 2 is an elevation of my improved sieve driving means with certain parts of the sieves being omitted for clarity, and also showing diagrammatically the orbiting motion of the sieve at different parts thereof; and FIG. 3 is a vertical section taken along line 3—3 of FIG. 2.

DESCRIPTION OF THE PREFERRED EMBODIMENT

FIG. 1 shows a combine 10 which includes a horizontal frame 11, two front wheels 12, and a rear wheel 13. An operator's cab 14 is mounted at the front end of the frame 11, and a casing 15 is mounted on the frame rearwardly of the cab, the threshing cylinder 16 and grain separating mechanism 17 being contained within the casing 15. A grain bin 18 extends downwardly from the frame 11 between the front and rear wheels 12 and 13, as shown in FIG. 1.

Extending diagonally upward and rearward from beneath the cab 14 is a feeder conduit 20 containing a slat elevator 21 which carries unthreshed grain from a grain head 22 up to the threshing cylinder 16.

The separating mechanism 17 comprises an upper sieve 30 and a lower sieve 40.

The upper sieve 30 comprises side frames 31 which support the sieve proper, which may be in the form of sheet metal sieve elements 32. The side frames 31 are extended rearwardly to support a recovery and tailings sieve 33. Both sieves 30 and 33 have longitudinally extending laterally spaced fish backs 34 having serrated upper edges (not shown in FIG. 2). A separate sieve element is located between the sieves 30 and 33 and functions as a dam 35. A feed pan 37 extends between the upper sieve 30 and the cylinder 16.

The lower sieve 40 comprises an upper side frame 41 and a lower side frame 42. The upper side frame supports sieve elements, similar to 32, and the lower side frame supports a perforated canvas bottom 43. Vertical members 44 connect the side frames 41 and 42. The upper side frame 41 is extended rearwardly to support a return pan 45 for the tailings recovered from the recovery sieve 33.

A more detailed description of all of the aforementioned elements is contained in copending application of Bernard C. Mathews, Ser. No. 186,053 filed Oct. 4, 1971, to which reference is hereby made.

Upper and lower sieves 30 and 40 are interconnected by linkages 50 and 60, as shown in FIG. 2, the linkage 50 being at the front and the linkage 60 being toward the rear of each sieve.

The front linkage 50 comprises a rock lever 51 having a fulcrum in the form of a bearing 52 which engages a suitable pivot pin (not shown) carried by a suitable structural member of the side wall of the casing 15. A link 53 connects the front end of rock lever 51 to the upper sieve 30, and a link 54 connects the rear end of rock lever 51 to the front end of the lower sieve 40.

The rear linkage 60 comprises a rock lever 61 having a bearing 62 which engages a suitable pivot pin extending from a suitable structural member of the side wall of the casing, the bearing serving as the fulcrum of the rock lever. A link 63 connects the front end of the rock lever 61 to the lower sieve 40 and a link 64 connects the rear end of the rock lever 61 to the upper sieve 30. The connections between each link and its associated sieve or lever end is a pivoted connection and preferably in the form of a bearing unit similar to the bearings 52 and 62 so that the linkage can support the weight of the sieves and the threshing mix thereon.

The arrangement is such that when the upper sieve is pushed down, then the lower sieve will rise up, and vice versa.

Orbiting movement is imparted to the upper sieve by a crank 36. As shown in FIG. 3, the crank 36 is mounted on a shaft 70 journalled in bearings 71 in the side wall 72 of casing 15. FIG. 3 shows only one end of the shaft 70 but it will be understood that the crank construction is duplicated at the other end of the shaft, just as the linkages 50 and 60, shown in FIG. 2, are duplicated at the other side of the casing.

The side frames 31 of the upper sieve 30 carry bearing blocks 74 which engage the eccentric crank portion 75 of the crank 36. Thus, rotation of the shaft 70 will cause orbiting movement of the upper sieve 30. A sprocket 76 is secured to the shaft 70 externally of the side wall 72 and is connected by a chain 77 to a similar sprocket affixed to the shaft of a similar crank 46, which engages the lower sieve 40. The shaft 70 is driven through a suitable chain and sprocket at the end opposite that shown in FIG. 3.

As viewed in FIGS. 1 and 2, clockwise rotation of the crank 36 will impart circular motion to the upper sieve 30 at this point. The vertical component of this circular motion will be transmitted by the rear linkage 60 to the rear end of the lower sieve 40.

Similarly, clockwise rotation of the crank 46 will impart circular motion to the front end of the lower sieve 40, and the vertical component of this motion will be transmitted by the front linkage 50 to the front end of the upper sieve 30.

The two cranks 36 and 46 have their eccentric crank portions 75, 180° apart so that the two sieves move in opposed phase relationship, which is maintained by the chain 77.

Thus, the upper and lower sieves, each being driven at one end by a crank in both the horizontal and vertical directions and at the other end by the linkages in only the vertical direction, are caused to move in an orbiting movement in opposed phase relationship. That is, as the upper sieve moves upwardly and rearwardly, the lower sieve will be moving downwardly and forwardly, and vice versa. The sieves counterbalance each other due to this opposed movement thus considerably reducing the vigration transmitted to the casing 15 at fulcrums 52 and 62.

One advantage of my invention is that the sieves and their contents are supported primarily at the fulcrums 52 and 62, although the cranks 36 and 46 may also perform some supporting function.

Another feature of my invention is that the magnitude of the vertical component of the orbiting movement may be graduated from one end of the sieve to the other in order to regulate the tossing action from one part of the sieve mechanism to another.

In the embodiment shown, the eccentricity of the crank 46 is one inch, providing a 2-inch throw for the lower sieve 40, and the eccentricity of the crank 36 is 2 inches, providing a 4-inch throw for the rear portion of the upper sieve. The fulcrum 62 is so located that the 4-inch vertical throw of the link 64 provides a 2-inch vertical throw for the link 63. Thus the vertical movement of both the front and back portion of the lower sieve is 2 inches.

The location of fulcrum 52 is such that the 2-inch vertical movement of the link 54 causes a two and a half-inch vertical movement of the link 53. Thus the front end of the upper sieve 30 has a two and one-half inch vertical throw, whereas the portion of the recovery sieve 33 immediately above the crank 36 has a 4-inch vertical throw. The horizontal movement of all parts of the assembly 30–33 will be four inches. Thus the front end of the upper sieve orbits in an elliptical path 80 (FIG. 2) having a 2½ inch vertical throw and a 4-inch horizontal throw, and the extent of the vertical throw increases as one approaches the rear end of the upper sieve, the throw at this point being 3.7 inches. The advantage of this arrangement is that it is possible to provide a greater vertical throw for the recovery sieve 33 than the average vertical throw of the upper sieve 30, even though they are rigidly connected to each other by the integral side frames 31. The throw at the rear end of the recovery sieve 33 is 4.7 inches, providing an elliptical path 82, whereas the path 81, above the crank 36, is circular.

Where it is desired to provide a circular orbiting path for all points of the upper sieve, then the location of the fulcrum 52 may be changed to correspond with the location of fulcrum 62.

Although only a preferred embodiment of the present invention has been described herein, it will be understood that various modifications and changes may be made in the construction shown without departing from the scope of the invention, as pointed out in the appended claims.

I claim:

1. Grain separating mechanism for a combine comprising substantially horizontally disposed upper and lower sieves spaced one above the other, each having a front portion and a rear portion, a first linkage connecting said rear portions, a second linkage connecting said front portions, each of said linkages comprising a substantially horizontally disposed rock lever and two vertically extending links connecting the opposite ends of said rock lever with said sieves, means for pivotally mounting said rock lever and providing a fulcrum therefor, a first crank engaging a portion of said upper sieve for imparting circular motion to said portion, and a second crank engaging a portion of said lower sieve for imparting circular motion to said portion.

2. Grain separating mechanism as claimed in claim 1 in which said crank engaged portion of said lower sieve is located close to one of said linkages, and in which said crank engaged portion of said upper sieve is located close to the other of said linkages.

3. Grain separating mechanism as claimed in claim 1 in which said first crank is located at the rear portion of said upper sieve, and said second crank is located at the front portion of said lower sieve, said first crank having a radius greater than said second crank, the fulcrum of said first linkage being so located that the vertical motion transmitted thereby to the rear portion of said lower sieve is substantially equal to the radius of said second crank, and the fulcrum of said second linkage being so located that the vertical motion transmitted thereby to the front portion of said upper sieve is less than the radius of said first crank whereby an elliptical motion is imparted to the front portion of said upper sieve.

* * * * *